US006188987B1

(12) United States Patent
Fielder

(10) Patent No.: US 6,188,987 B1
(45) Date of Patent: Feb. 13, 2001

(54) PROVIDING AUXILIARY INFORMATION WITH FRAME-BASED ENCODED AUDIO INFORMATION

(75) Inventor: Louis Dunn Fielder, Millbrae, CA (US)

(73) Assignee: Dolby Laboratories Licensing Corporation, San Francisco, CA (US)

( * ) Notice: Under 35 U.S.C. 154(b), the term of this patent shall be extended for 0 days.

(21) Appl. No.: 09/193,186

(22) Filed: Nov. 17, 1998

(51) Int. Cl.$^7$ .................................................. G10L 19/00

(52) U.S. Cl. .................... 704/501; 704/500; 704/229; 704/230

(58) Field of Search ................................. 704/500–504, 704/229, 230; 348/472, 512, 515; 369/48, 59, 93; 360/32, 48, 27

(56) References Cited

U.S. PATENT DOCUMENTS

| 5,142,656 | * | 8/1992 | Fielder et al. ........................ 704/229 |
| 5,842,171 | * | 11/1998 | Greenwood et al. ................. 704/500 |
| 6,085,163 | * | 7/2000 | Todd .................................... 704/500 |

FOREIGN PATENT DOCUMENTS

| 0690630A2 | 1/1996 | (EP) . |
| 0690630A3 | 4/1998 | (EP) . |

OTHER PUBLICATIONS

"10–Bit 4:2:2 Component and 4f$_{sc}$ NTSC Composite Digital Signals.— Serial Digital Interface" SMPTE Journal, N.Y, vol. 102, No. 2, Jan. 1993, pp. 174–179.
Reynolds, K., Et Al: "Multiplexing and Demultiplexing Digital Audio and Video in Today's Digital Environment" 8012 SMPTE Journal, N.Y, vol. 102, No. 10, Oct. 1993, pp. 905–909.
Wilkinson J., Sony Broadcast & Professional Europe, U.K., "The Serial Digital Data Interface (SDDI)" International Broadcasting Convention, London, Conf. Pub. No. 428, IEE, 1996, pp. 425–430.
Proposed SMPTE Standard for Television—SMPTE 272M, SMPTE Journal, Apr. 1994, pp. 294–300.
Proposed SMPTE Standard for Television—SMPTE 299M, SMPTE Journal, Aug. 1996, pp. 516–523.
AES Recommended practice for digital audio engineering, AES3–1992 (ANSI S4.40–1992), J. Audio Eng. Soc., vol. 40, No. 3, Mar. 1992, pp. 147–165.
Fibush, D.K., "Integrating Digital Audio into the Serial Digital Video Signal," SMPTE Journal, Sep. 1994, pp. 574–579.
Proposed SMPTE Standard for Television—SMPTE 259M, SMPTE Journal, Feb. 1993, pp. 174–179.
Report of the meeting of the SC–02–05 Working Group, J. Audio Eng. Soc., vol. 43, No. 5, May 1995, p. 365.
AES Recommended practice for digital audio engineering, AES11–1997, J. Audio Eng. Soc., vol. 45, No. 4, Apr. 1997, pp. 260–269.

* cited by examiner

Primary Examiner—David R. Hudspeth
Assistant Examiner—Vijay B Chawan
(74) Attorney, Agent, or Firm—Gallagher & Lathrop; David N. Lathrop

(57) ABSTRACT

Blocks of encoded audio information are arranged in frames separated by gaps or guard bands that are aligned with frames of video information. The gaps are provided to protect the audio information against corruption caused by uncertainties or jitter in editing operations such as switching between two difference sources of video/audio information. The otherwise wasted space or bandwidth required to convey the gaps is utilized by conveying encoded segments of auxiliary information. When the encoded auxiliary information is subsequently decoded, an error recovery process provides substitute information for those segments that are corrupted by an editing operation. In one embodiment, the recovery process is adapted according to the choice of an auxiliary sync word conveyed in the segment.

43 Claims, 9 Drawing Sheets

PROVIDING AUXILIARY INFORMATION WITH FRAME-BASED ENCODED AUDIO INFORMATION

CROSS-REFERENCE TO RELATED APPLICATIONS

This application is related to U.S. patent application Ser. No. 08/953,324 filed Oct. 17, 1997, U.S. patent application Ser. No. 08/953,121 filed Oct. 17, 1997, U.S. patent application Ser. No. 08/953,106 filed Oct. 17, 1997, U.S. patent application Ser. No. 08/953,306 filed Oct. 17, 1997, U.S. patent application Ser. No. 08/953,618 filed Oct. 17, 1997, U.S. patent application Ser. No. 09/042,367 filed Mar. 13, 1998, and U.S. patent application Ser. No. 09/175,090 filed Oct. 19, 1998, all of which are incorporated herein by reference.

TECHNICAL FIELD

The present invention relates generally to audio signal processing in video/audio applications. More particularly, the present invention relates to encoding and decoding information conveyed in gaps or guard bands between frames of audio information that may be aligned with or, alternatively, embedded into frames of video information.

BACKGROUND ART

Several international standards have been developed which define various aspects of embedding digital audio information into frames of video information. For example, standard SMPTE 259M published by the Society of Motion Picture and Television Engineers (SMPTE) defines a Serial Digital Interface (SDI) in which up to four channels of digital audio information may be embedded into component and composite serial digital video signals. Standard SMPTE 272M provides a full definition of how digital audio information is to be embedded in ancillary data spaces within frames of the video information.

The serial transmission of digital audio information itself is the subject of various international standards. For example, standard AES3 (ANSI S4.40) published by the Audio Engineering Society (AES), defines serial transmission of two-channel digital audio represented in a linear pulse code modulation (PCM) form. According to this standard, PCM samples for two channels are interleaved and conveyed as pairs in two-sample frames.

A common activity in nearly all recording and broadcasting applications is editing or cutting embedded video/audio information streams and splicing the cut information streams to form a new single stream. Similar activities generate an information stream by merging multiple information streams or by switching between multiple streams. The video information is normally the primary synchronizing reference so that an edit or cut point is normally aligned with a video frame.

Standards such as AES11 define recommended practices for synchronizing digital audio equipment in studio operations. AES11 is directed toward controlling timing uncertainties caused by jitter or processing delays and provides for aligning video frame information with the two-sample frames of AES3 digital audio information streams. Equipment and methods that adhere to this standard can ensure that synchronized signals have the same number of frames over a given period of time and contain samples that have a common timing. Unfortunately, no standards or practices currently exist which define an alignment between video information and larger intervals of audio information. As a result, equipment from different manufacturers and even from the same manufacturer have variations in timing and in processing delays that introduce a significant amount of uncertainty in the relative alignment of audio and video information.

This uncertainty in alignment is of little consequence in applications that represent audio information in a manner such as that defined in the AES3 standard. Because edit points are constrained to occur between the two-sample frames of audio information, any uncertainty in video/audio alignment will not result in the loss of audio information. It will only affect the relative timing of sound and picture as presented to a person, which is unlikely to be discernable.

There is, however, a growing number of applications that use bit-rate-reduction encoding techniques to embed greater numbers of audio channels into a video/audio data stream. These encoding techniques are often applied to sample blocks of 128 or more audio samples to generate blocks of encoded information. These sample blocks typically represent audio information that spans an interval of 5 to 24 ms. Each block of encoded information generated by these encoding processes represents the smallest unit of information from which a reasonably accurate replica of a segment of the original audio information can be recovered. Split-band coding is one example of a bit-rate-reduction technique that reduces bit rates by applying psychoacoustic-based coding to frequency-subband representations of an audio signal. The frequency-subband representations may be generated by application of a plurality of bandpass filters or one or more transforms. For ease of discussion, these split-band coding techniques are described here in terms of applying a filterbank to generate subband signals.

The uncertainty in alignment mentioned above is significant in these block-coding applications because an edit point falling within the boundaries of an encoded block will result in part of that block being cut from the remaining signal. The partial loss of an encoded block will be manifested by a loss in the recovered signal for the entire block, which is for a duration typically of 5 ms or more. It is likely that such a loss would be discernable to the human auditory system.

This problem may be avoided by using a post-processing process in which a PCM representation of the original audio signals is recovered by applying a decoding process to the encoded audio, editing the recovered PCM representation as required, and generating a new encoded representation by applying an encoding processed to the edited PCM audio information. This solution is unattractive because of the additional costs and degradation in audio quality resulting from the decoding/re-encoding processes.

This problem may also be avoided by providing gaps or guard bands in the encoded audio information at locations of possible edit points. The guard bands have sufficient duration to span across the variations in alignment mentioned above so that an edit point will fall somewhere within a guard band. An edit point that falls within a guard band does not cause any loss of audio information. Unfortunately, the additional space or bandwidth required to convey the guard bands is essentially wasted because it is not used to convey any useful information.

DISCLOSURE OF INVENTION

It is an object of the present invention to utilize the information carrying capacity of guard bands used to separate frames of encoded audio information.

According to the teachings of one aspect of the present invention, a method encodes audio information and auxiliary information by receiving an audio signal conveying audio information, receiving a reference signal, receiving an auxiliary signal conveying auxiliary information, constructing auxiliary segments each comprising a block of auxiliary information and an error detection code, and generating an output signal conveying the audio information arranged in frames separated by gaps such that each gap is aligned with the reference signal and conveys a respective auxiliary segment, wherein the audio information in the frames of audio information and the auxiliary information in the segments of auxiliary information are constrained to avoid data patterns in a set of one or more forbidden data patterns.

According to the teachings of another aspect of the present invention, a method decodes audio information and auxiliary information by receiving an input signal conveying audio information arranged in frames separated by gaps and conveying auxiliary segments arranged in the gaps, processing the input signal to locate the auxiliary segments, for each respective auxiliary segment, extracting a block of auxiliary information and an error detection code, and evaluating the error detection code to validate contents of the block of auxiliary information.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

Throughout this discussion, more particular mention is made of audio information that is encoded into blocks and conveyed in frames of one or more blocks that are aligned with video information. These references to audio and video information merely describe one field of application for the present invention. The audio information is merely one example of information that is intended to be conveyed without error because the use of this information is intolerant of error. Frames of essentially any type of information may be conveyed in addition to or, alternatively, instead of audio information.

In contrast, the use of the auxiliary information that is conveyed in the gaps or guard bands must tolerate errors that may be caused by edits. As explained below, these errors may be tolerated by some form of error recovery or they may simply be ignored. For example, auxiliary information conveying speech can usually tolerate an occasional error without comprising the intelligibility of the speech.

MODES FOR CARRYING OUT THE INVENTION

Overview of a System

Figure 1:
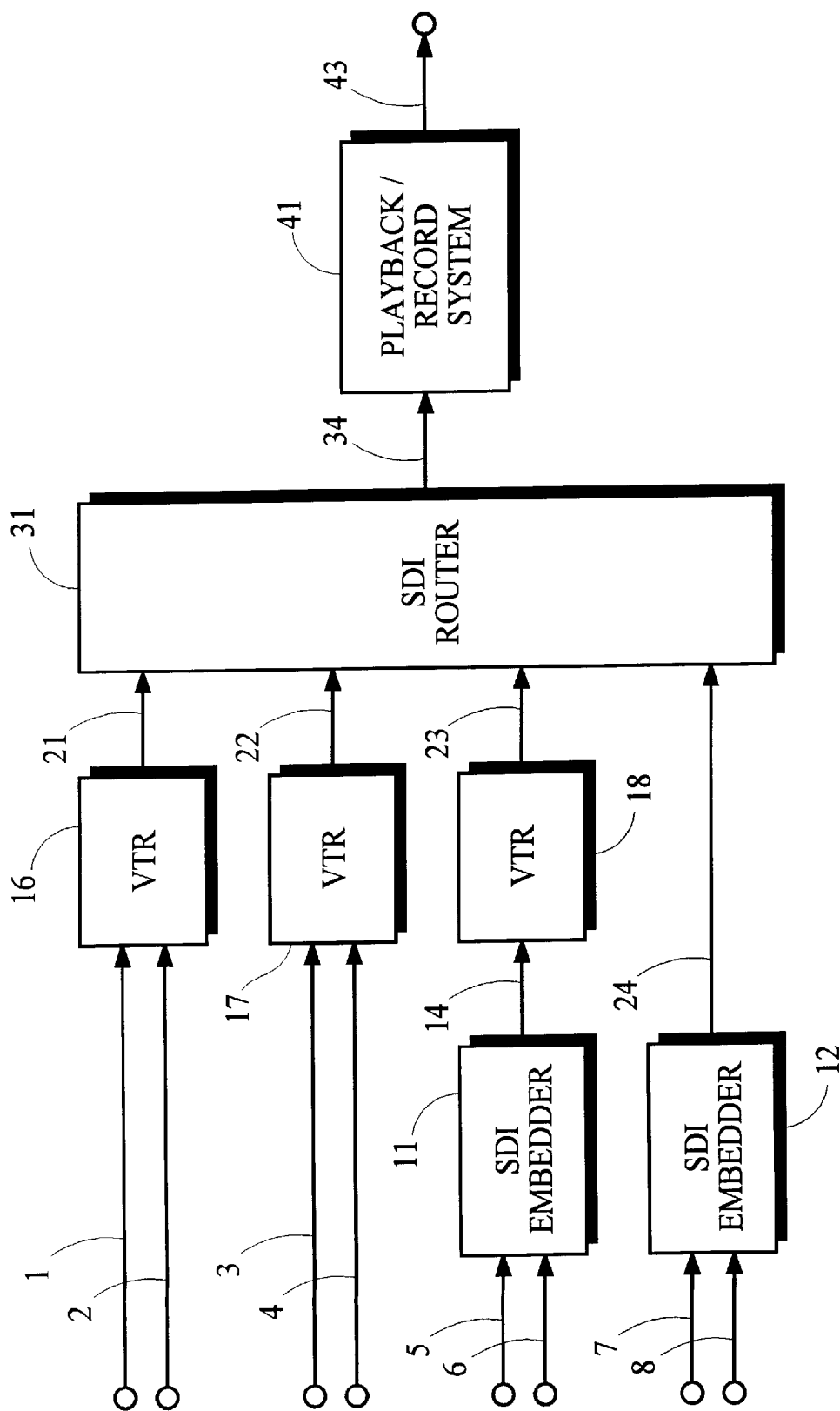
FIG. 1 is a block diagram of one embodiment of a system for recording and for routing multiple video/audio data streams.

FIG. 1 illustrates one embodiment of a system for recording and for routing multiple video/audio data streams and represents one example of a system that can advantageously employ aspects of the present invention. For the sake of clarity, this figure as well as all other figures do not illustrate signal paths for carrying master clock signals used to synchronize the equipment. It is assumed in this discussion that signals such as those generated along paths 21, 22, 23 and 24 conform to standards such as SMPTE 259M and SMPTE 272M; however, no particular standard or signal format is essential to practice the present invention. For example, in an alternative embodiment of the system, separate signals each conveying respective video information and audio information are generated along paths 21 through 24, and router 31 includes circuitry for separately routing video and audio information. In such an embodiment, an SDI disembedder is interposed between SDI embedder 12 and router 31. This alternative embodiment is mentioned to show that no particular signal format or signal content is essential to practice the present invention.

Video tape recorder (VTR) 16 receives video information from path 1 and audio information from path 2 and records this video/audio information on tape. Subsequently, VTR 16 reads the video/audio information recorded on tape and generates along path 21 a playback signal conveying the video information with embedded audio information. In a similar manner, VTR 17 records video and audio information received from paths 3 and 4, respectively, and subsequently generates along path 22 a playback signal conveying the video information with embedded audio information.

VTR 16, VTR 17 and VTR 18 include circuitry such as a Serial Digital Interface (SDI) embedder for embedding audio information into the video information during playback.

SDI embedder 11 receives video and audio information from paths 5 and 6, respectively, and generates along path 14 a signal conveying digital video information with embedded digital audio information. VTR 18, which includes circuitry such as a SDI disembedder, extracts audio information from the video/audio data signal and records the separated video and audio information on tape. Subsequently, VTR 18 recovers the video and the audio information from tape and uses circuitry such as an SDI embedder to generate along path 23 a playback signal conveying the video and embedded audio information. If a digital data recorder is substituted for VTR 18, however, neither embedder nor disembedder circuitry is required in the recorder because the video/audio data stream itself can be recorded and played back.

SDI embedder 12 receives video and audio information from paths 7 and 8, respectively, and generates along path 24 a signal conveying digital video information with embedded digital audio information.

SDI router 31 receives video/audio signals from paths 21, 22, 23 and 24 and selectively routes or switches these signals along path 34 to playback/record device 41. The number of signals received by SDI router 31 is not significant. Playback/record device 41 represents an arbitrary device that uses the signal passed along path 34. For example, it can be a recording device such as VTR or a playback device such as a television set. Furthermore, playback/record 41 may be located remotely with respect to SDI embedder 31, in which case path 34 may represent a communication or broadcast channel.

Shifts in Video/Audio Alignment

Circuit delays in VTR 16, 17, 18 and in SDI embedder 11 and 12 may alter the relative alignment of video information and audio information. As a result, the alignment of video/audio information in playback signal 21, for example, may be shifted with respect to the alignment between video information and audio information as received from paths 1 and 2, respectively. The amount of the change in alignment varies among equipment from different manufacturers, can vary among different pieces of equipment from the same manufacturer, and can even vary within a given piece of equipment as a function of the initialization state of buffers, for example.

Figure 2A:
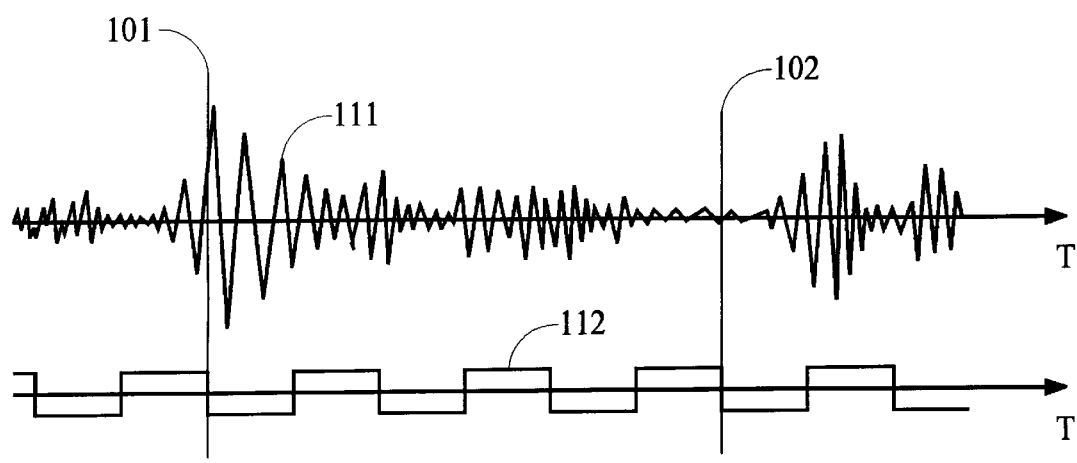
FIGS. 2A through 2C are graphical representations of hypothetical audio signals having various alignments with video frame references.

Referring to FIG. 2A, signal 111 represents audio information having a particular alignment with video frame references 101 and 102. Each of these video frame references indicates a particular reference point in a respective video frame. A common reference point for NTSC video information, for example, coincides with the video information for line 10 in each frame. A common reference point for PAL video information coincides with line 1 in each frame. No particular alignment is critical to the practice of the present invention.

Figure 2B:
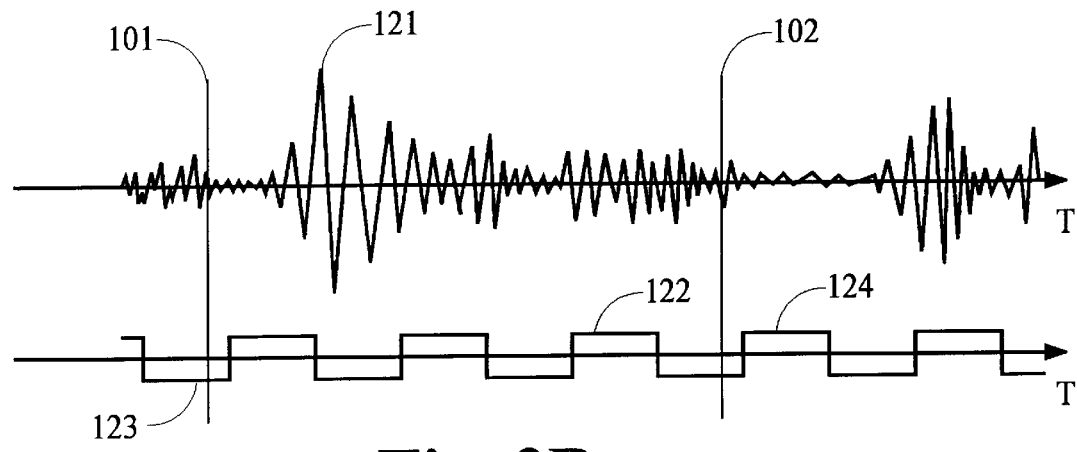
Figure 2C:
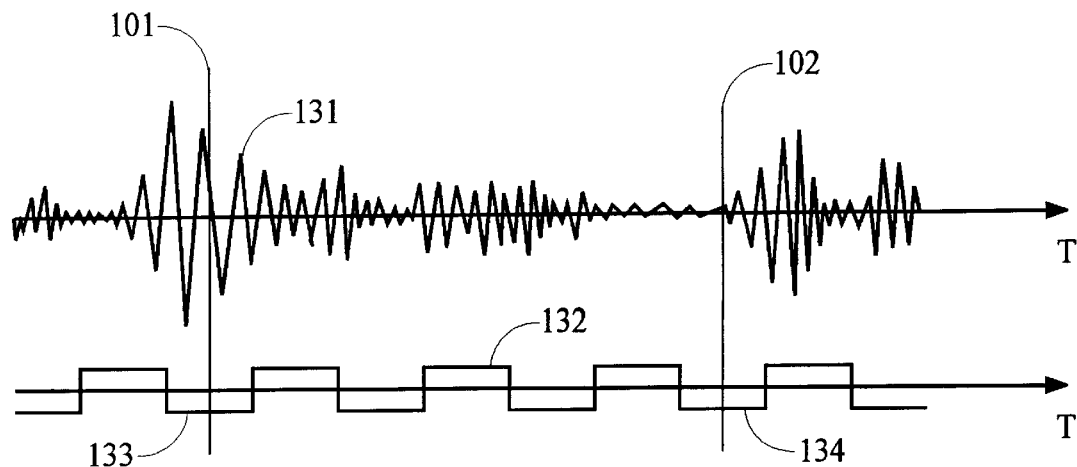

In FIG. 2B, signal 121 represents the same audio information as that conveyed by signal 111 but is delayed with respect to signal 111. As a result, the alignment between signal 121 and the video frame references is shifted with respect to the alignment for signal 111. In FIG. 2C, signal 131 represents the same audio information as that conveyed by signal 111 but is advanced with respect to signal 111; hence, the alignment between signal 131 and the video frame references is shifted in a manner opposite to the shift in alignment of signal 121.

Referring to FIG. 1, suppose the audio information and alignment represented in FIG. 2A is conveyed by paths 1/2, 3/4, 5/6 and 7/8. Different shifts in alignment such as those illustrated in FIGS. 2A through 2C will likely exist in the signals generated along paths 21 through 24. Suppose further that the alignments illustrated in FIGS. 2A through 2C exist in the signals generated along paths 21 through 23, respectively. When SDI router 31 switches between signals received from these three paths, a small discontinuity will occur in the audio information embedded in the signal passed along path 34. If the audio information is represented in a form such as PCM, this discontinuity may not be perceived by a human listener because the discontinuity is only for a few samples. It would be more difficult to discern a discontinuity between two signals having different audio content.

Effects of Encoding

As explained above, however, there is a growing interest to embed greater numbers of audio channels into a video/audio data stream. When the capacity of the information in these greater number of audio channels exceeds the capacity of the space available for audio information, some form of bandwidth or bit-rate compression is employed. One example of such compression is audio coding based on psychoacoustic principles.

These encoding techniques are often applied to blocks of audio samples to generate blocks of encoded information. These sample blocks typically represent audio information that spans an interval of 5 to 24 ms. Each block of encoded information generated by these encoding processes represents the smallest unit of information from which a reasonably accurate replica of a segment of the original audio information can be recovered.

A sequence of encoded information blocks 112 is represented as a train of pulses in FIG. 2A. The information conveyed by these blocks is an encoded representation of one or more channels of audio information such as that illustrated by signal 111. The shape and size of the pulses is not significant. The pulse train is intended only to suggest a sequence of blocks that convey encoded information corresponding to blocks of audio samples for one or more channels that may abut one another or, preferably, overlap one another. In the example shown in FIG. 2A, the audio information spanning the interval between adjacent video frame references is represented by six blocks of encoded information. Various considerations for improving the quality of audio coding in video/audio applications is disclosed in copending U.S. patent application Ser. No. 08/953,106, which is incorporated herein by reference in its entirety.

When block encoding techniques are used in the system of FIG. 1, the signals that SDI router 31 receives from paths 21 through 24 contain audio information encoded in blocks. As discussed above, varying shifts in alignment may occur between the encoded information blocks and the video frame references. This is illustrated by the different alignments between video frame reference 101, for example, and blocks 112, 122 and 132 shown in FIGS. 2A, 2B and 2C, respectively. Suppose, as discussed above, that the alignments illustrated in FIGS. 2A through 2C exist in the signals generated along paths 21 through 23, respectively. When SDI router 31 switches at video frame reference 101 from the signal received via path 22, illustrated in FIG. 2B, to the signal received via path 23, illustrated in FIG. 2C, a significant amount of audio information at the switch point cannot be recovered from the signal routed along path 23. The audio information conveyed in block 123 prior to the switch point cannot be recovered because, on the one hand, the entire block is needed to recover the audio information but, on the other hand, the portion of that block after the switch point is missing. Similarly, the audio information conveyed in block 133 after the switch point cannot be recovered because the portion of block 133 prior to the switch point is missing.

This problem is not unique to the type of system illustrated in FIG. 1. For example, the problem also occurs with tape edits or audio dubbing for a single VTR.

This problem may be overcome by forming guard bands or gaps in the encoded audio stream so that considerable variation in video/audio alignment can be tolerated without loss of audio information. One way in which guard bands may be formed is to divide audio information into segments and then form time-compressed representations of each segment. This may be accomplished using a signal processor such as that shown in FIG. 3.

Encoding Signal Processor

Figure 3:
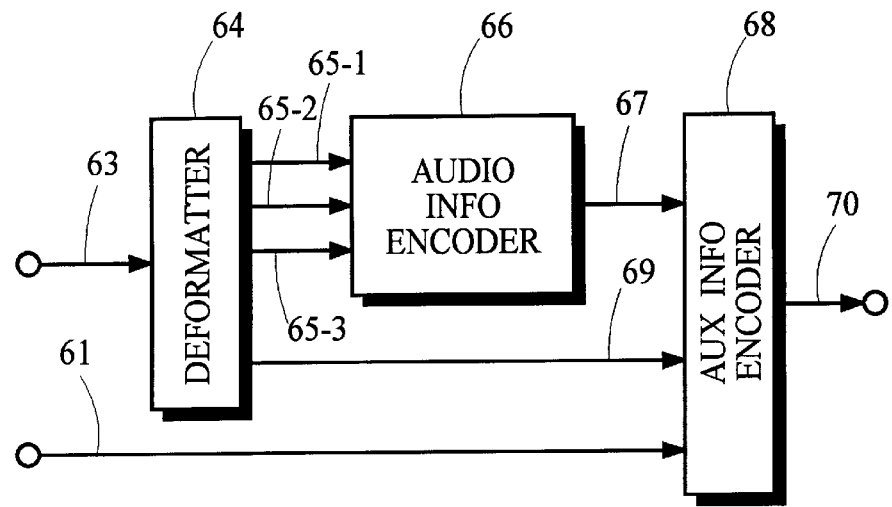
FIG. 3 is a block diagram of an embodiment of a signal processing device with an auxiliary information encoder according to the present invention.

FIG. 3 illustrates a signal processor that can be incorporated in a variety of ways into a system such as that illustrated in FIG. 1. In the embodiment shown, a signal conveying frames of video information with embedded audio information is received from input signal path 63. Deformatter 64 receives the video/audio information from path 63, extracts frames of the embedded audio information from the input signal and passes it along path 65. A reference signal conveying the alignment of the frames is passed along path 69. The video information itself may also be passed along path 69. Audio information encoder 66 receives audio information from path 65 and applies a block-encoding process to the audio information to generate along path 67 blocks of encoded audio information. Auxiliary information encoder 68 receives the blocks of encoded audio information from path 67, receives the reference signal from path 69, receives a signal from path 61 conveying auxiliary information, and generates along path 70 an output signal comprising frames of encoded audio information separated by gaps or guard bands that are aligned with the reference signal and that convey segments of auxiliary information. The manner in which segments of auxiliary information may be encoded into the guard bands is discussed below.

Preferably, each frame comprises a sequence of blocks of encoded audio information with the gaps or guard bands formed between a beginning block in one sequence and an ending block in a preceding sequence. It is also possible to form frames with a single block of encoded audio information. For ease of explanation, however, the remaining discussion generally refers to frames comprising a sequence of blocks.

Audio Information Encoding

As mentioned above, the figures do not illustrate signal paths for carrying master clock signals used to synchronize multiple pieces of equipment. In a preferred embodiment, audio information encoder 66 forms audio sample blocks that are aligned with the master clock signal. This alignment is illustrated in FIG. 2A where boundaries between adjacent sample blocks coincide with video frame references 101 and 102; however, other alignments may be used.

Figure 5A:
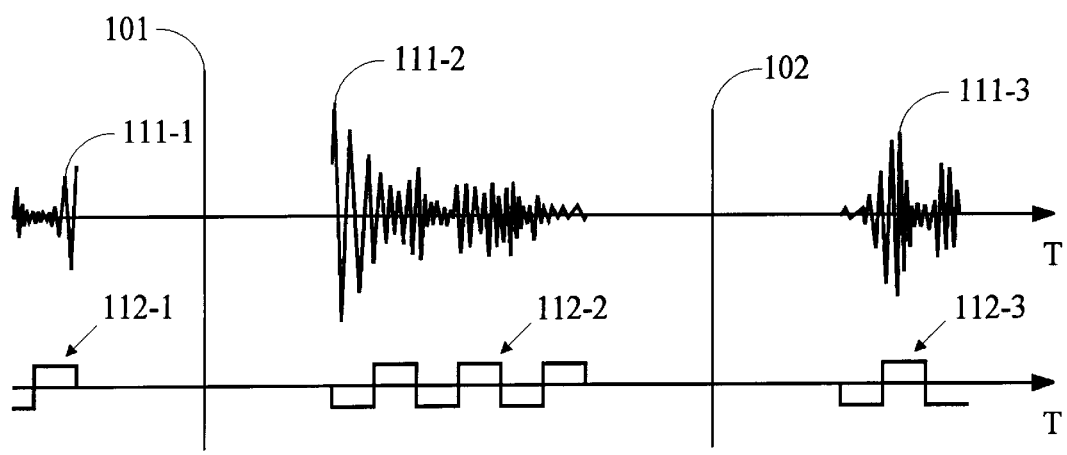
FIGS. 5A through 5C are graphical representations of hypothetical audio signals with guard bands and having various alignments with video frame references.

Referring to FIG. 5A, a sequence of blocks in frame 112-2 conveys encoded information representing signal segment 111-2, which is a hypothetical time-compressed representation of the portion of signal 111 between video frame references 101 and 102. Similarly, a sequence of blocks in frame 112-1 conveys encoded audio information representing signal segment 111-1 and a sequence of blocks in frame 112-3 conveys encoded audio information representing signal segment 111-3. Audio information encoder 66 and auxiliary information encoder 68 generate frames of blocks conveying an encoded representation of the audio information that are separated by gaps or guard bands. For example, a guard band or gap is formed between the ending block of a sequence in frame 112-1 and the beginning block of a sequence in frame 112-2.

Figure 5B:
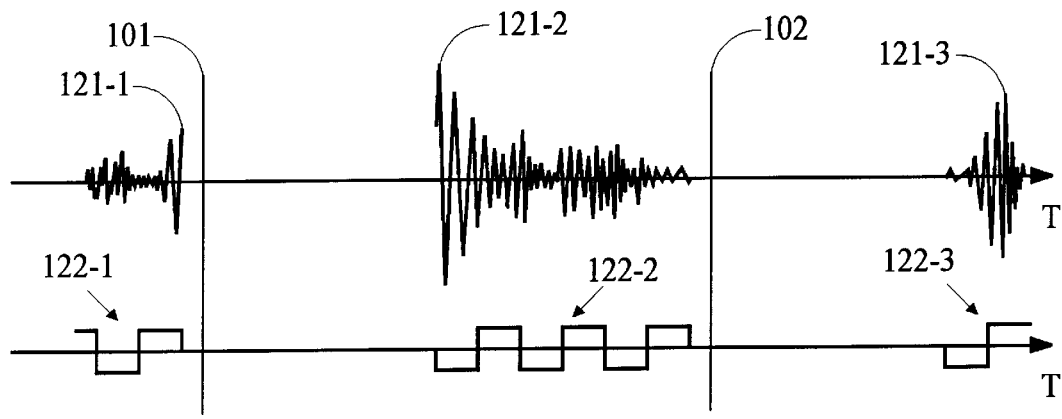
Figure 5C:
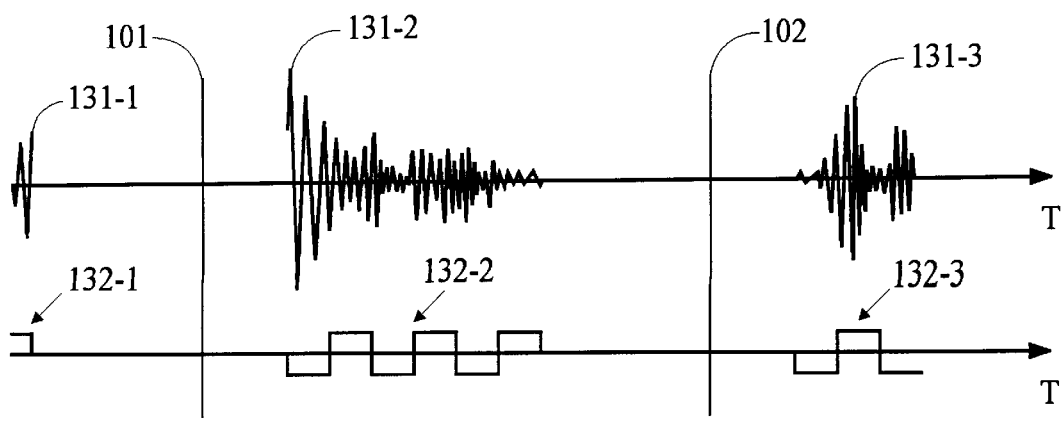

The shifts in alignment illustrated in FIGS. 2A through 2C are also illustrated in FIGS. 5A through 5C. In these figures, encoded audio information in frames 122-1, 122-2, 122-3, 132-1, 132-2 and 132-3 convey a representation of signal segments 121-1, 121-2, 121-3, 131-1, 131-2 and 131-3, respectively. As may be seen from FIGS. 5B and 5C, no loss in encoded audio information occurs as a result of shifts in alignment because potential switch points at video frame references 101 and 102 occur within a guard band.

The signal processor illustrated in FIG. 3 can be incorporated into a VTR or SDI embedder. In another embodiment that omits deformatter 64, audio information is received from path 65 that is distinct from but aligned with video information that is received from path 69. Such an embodiment can be incorporated into a VTR or into the input circuits of an SDI embedder, for example.

Figure 4:
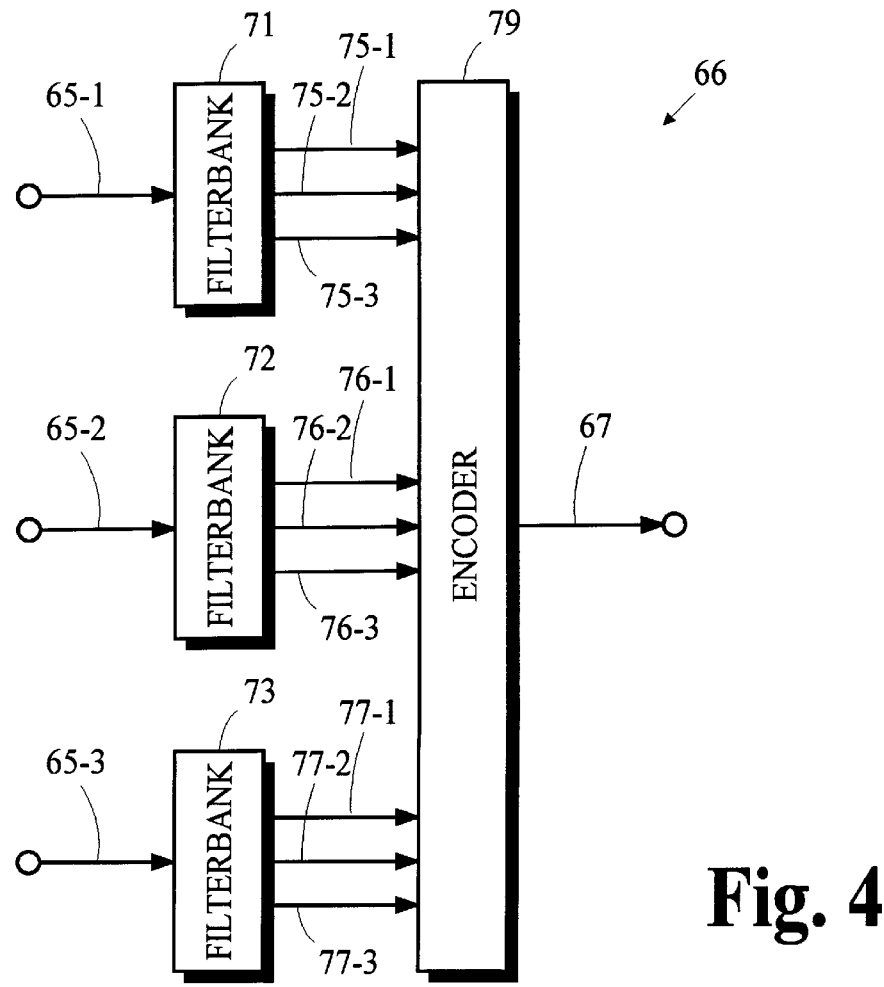
FIG. 4 is a block diagram of one embodiment of an audio information encoder.

FIG. 4 illustrates one embodiment of audio information encoder 66 that is suitable for incorporation into the embodiment illustrated in FIG. 3. According to this embodiment, audio information encoder 66 comprises a plurality of filterbanks 71, 72 and 73. Filterbank 71 generates a plurality of frequency subband signals along paths 75-1 through 75-3 in response to the signal received from path 65-1. Filterbank 72 generates a plurality of frequency subband signals along paths 76-1 through 76-3 in response to the signal received from path 65-2. Filterbank 73 generates a plurality of frequency subband signals along paths 77-1 through 77-3 in response to the signal received from path 65-3. Filterbanks 71, 72 and 73 may be implemented in a number of ways including a bank of bandpass filters, a cascading set of bandsplitting filters, and one or more time-domain-to-frequency-domain transforms. Only three filterbanks are shown and only three subband signals are shown for each filterbank, however, an embodiment may include essentially any number of filterbanks that each generate essentially any number of subband signals. Preferably, in embodiments for high-fidelity audio having a bandwidth of 15 kHz or more, each filterbank generates on the order of twenty or more subband signals, each representing frequency subbands having bandwidths commensurate with or less than the critical bandwidths of the human auditory system. Encoder 79 applies a block encoding process to the subband signals and generates along path 67 a sequence of blocks representing in an encoded form the audio information received via paths 65-1, 65-2 and 65-3.

Split-band coding is not essential. Other forms of coding such as block-companded PCM or blocks of samples encoded by delta-modulation may be used.

In one practical embodiment, an audio information encoder receives eight channels of audio information in linear PCM form or, alternatively, four AES3 data streams, and uses eight filterbanks and an encoder that applies a block encoding process to generate frames of encoded information with guard bands that can be conveyed in a space or bandwidth no larger than that required to convey two channels of audio information in PCM form or, alternatively, one AES3 data stream.

Auxiliary Information Encoding

Figure 6:
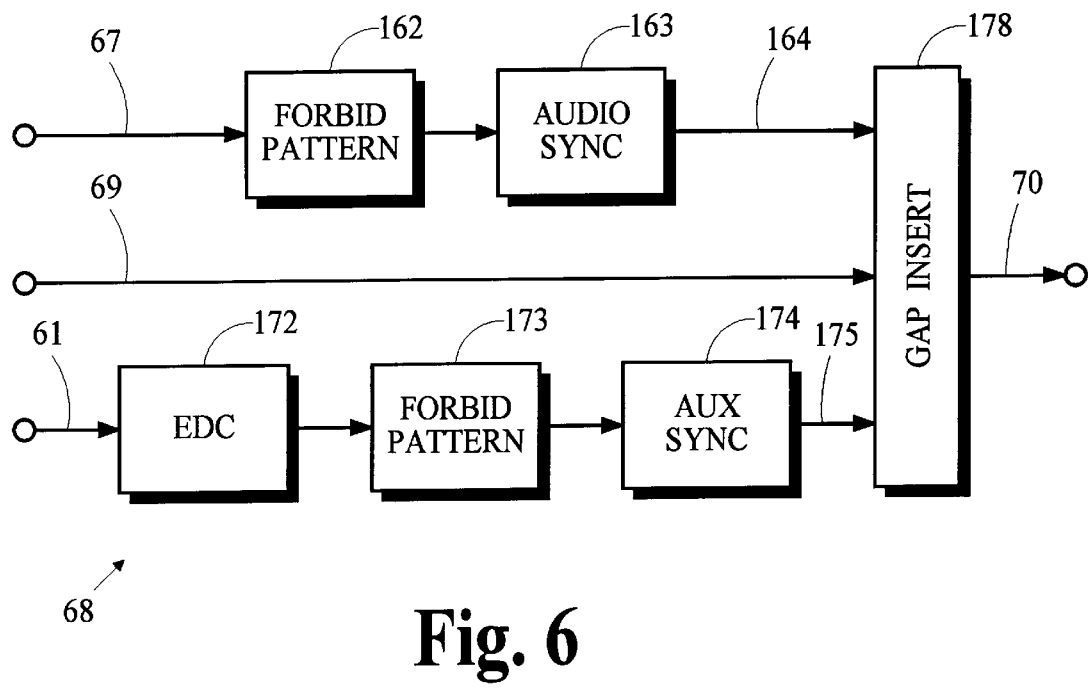
FIG. 6 is a block diagram of one embodiment of an auxiliary information encoder.

FIG. 6 illustrates an embodiment of auxiliary information encoder 68. In this embodiment, blocks of encoded audio information are received from path 67. Generally, these blocks convey digital information as strings of binaryvalued symbols or "bits" that may assume essentially any pattern or value. In many systems, however, certain bit patterns in digital information are "forbidden" either because they are reserved for special use or because their occurrence causes one or more problems in equipment used to process the information. One example is found in systems that use a "sync" pattern to mark the boundary of a frame of information in a data stream. Because the sync pattern is used in such systems to align or synchronize equipment that process the information, a chance occurrence of encoded audio information having the sync pattern will disrupt the processing of the information if the chance occurrence is incorrectly identified as a valid sync pattern.

Forbid pattern 162 is used to prevent a sync pattern or other forbidden data pattern from occurring in the encoded audio information by modifying the encoded information to remove occurrences of forbidden data patterns and by including a key or other control information that can be used to reverse the modifications. A suitable implementation for forbid pattern 162 is discussed below. If the content of the encoded audio information received from path 67 is constrained to avoid all reserved data patterns, then forbid pattern 162 is not required.

Audio sync 163 provides a sync pattern that may be used to synchronize or align equipment with the encoded audio information. This component is not required in systems that do not use an audio sync pattern.

EDC 172 receives blocks of auxiliary information from path 61 and, for each block, constructs auxiliary segments comprising respective blocks of auxiliary information and corresponding error-detection codes that can be used to detect undesired changes or errors in the contents of a respective block. The error-detection codes may conform to a wide variety of schemes such as, for example, parity codes, cyclical-redundancy codes or Fletcher checksums. Error-detection-correction codes such as Gray codes or Reed-Solomon codes that permit correction as well as detection of changes may also be used; however, the present invention provides a different mechanism for recovering from changes or errors in a block of information.

Forbid pattern 173 may be used to prevent a sync pattern or other forbidden data pattern from occurring in the auxiliary segments by modifying the segments to remove occurrences of forbidden data patterns and by including a key or other control information that can be used to reverse the modifications. An implementations is discussed below. If the content of the auxiliary information received from path 61 is constrained to avoid all forbidden data patterns, then forbid pattern 173 may not be required if the error-detection codes can be constructed in such a manner that all forbidden data patterns are avoided. For example, this may be accomplished by appending or merging the codes with bit strings that are designed to ensure no forbidden data pattern can occur.

Aux sync 174 provides a sync pattern that may be used to synchronize or align equipment with the auxiliary segments. This component is not required in systems that do not use an aux sync pattern.

Gap insert 17 receives from path 164 blocks of encoded audio information as modified by forbid pattern 162 and/or audio sync 163 if present, receives from path 69 a reference signal that indicates frame alignment, and receives from path 175 the auxiliary segments as modified by forbid pattern 173 and/or aux sync 174 if present. Gap insert 17 generates along path 70 an output signal comprising frames of encoded audio information that are separated by gaps or guard bands. The gaps are aligned with the reference signal and convey the auxiliary segments.

Information Stream Format

Figure 7:
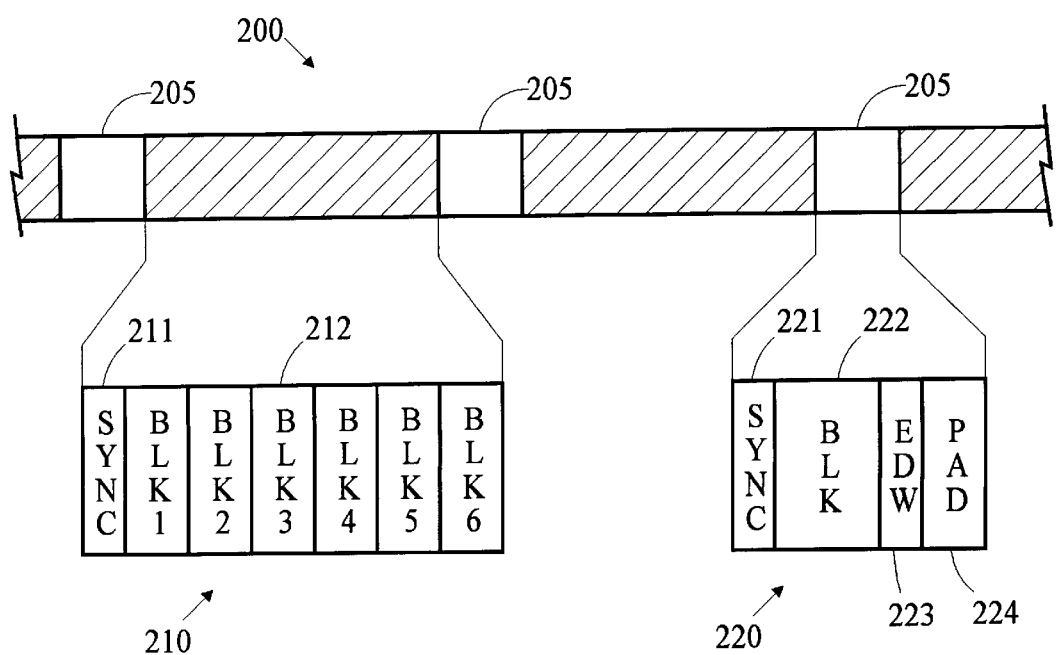
FIG. 7 is a schematic diagram of one way in which auxiliary information may be encoded and assembled into gaps separating frames of encoded audio information.

FIG. 7 illustrates one way in which auxiliary segments 220 may be encoded and assembled into gaps 205 separating frames 210 of encoded audio information in information stream 200. Each frame 210 of encoded audio information comprises audio sync word 211 and one or more blocks 212 of encoded audio information. Examples discussed below and illustrated in the figures arbitrarily assume each frame includes six blocks of encoded audio information. The audio sync word 211 in each frame has a reserved pattern that is a forbidden data pattern.

Each auxiliary segment 220 comprises aux sync word 221, block 222 of auxiliary information, and error-detection word 223. The auxiliary sync word 221 in each auxiliary segment has a reserved pattern that is a forbidden data pattern. An embodiment of the present invention may allow the length of each block 222 of auxiliary information to vary by providing an indication of the length of each block. This may be done in a variety of ways such as by providing a word at the beginning of each block that specifies the number of bits or, alternatively, the number of 8-bit bytes in the block. A pad 224 may be provided as necessary to expand the length of auxiliary segment 220 so that it exactly fills gap 205. The content of pad 224 should avoid all forbidden data patterns.

The contents of information stream 200 may be encoded and assembled in a variety of orders and combinations. For example, audio sync words or aux sync words may be omitted in systems that do not require them. If audio sync words are provided at a known position within each frame and the length of each frame is known, aux sync words may be omitted because the start of each auxiliary segment can be determined from the known audio sync position and frame length. Similarly, if aux sync words are provided at a known position within each auxiliary segment and the length of each auxiliary segment is known, audio sync words may be omitted because the start of each audio frame can be determined from the known aux sync position and segment length.

Decoding Signal Processor

Figure 8:
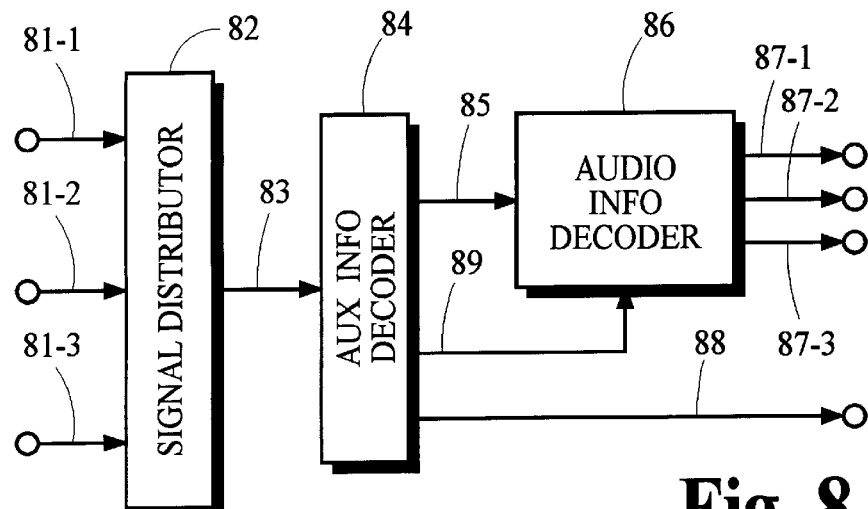
FIG. 8 is a block diagram of an embodiment of a signal processing device with an auxiliary information decoder according to the present invention.

FIG. 8 illustrates a signal processor that can be incorporated in a variety of ways into a system such as that illustrated in FIG. 1. In the embodiment shown, a plurality of signals conveying video information with embedded encoded audio information and segments of auxiliary information are received from input signal paths 81-1, 81-2 and 81-3. Three input signal paths are shown in the figure; however, embodiments of the signal processor may have signal paths for essentially any number of input signals. Signal distributor 82 represents a wide range of signal distribution processes including switching, merging, editing, splicing and storage/retrieval. For simplicity, the illustration and discussion herein assume signal distributor 82 receives a plurality of signals and processes and/or distributes those signals in some manner to generate along path 83 a signal conveying video information with embedded encoded audio information arranged in a plurality of frames with gaps or guard bands between frames that are aligned with the video information and that convey segments of auxiliary information.

Auxiliary information decoder 84 receives the video/audio/auxiliary information from path 83, extracts the embedded blocks conveying encoded audio information and passes the extracted blocks along path 85, and extracts segments of auxiliary information and passes the extracted auxiliary information along path 88. A reference signal conveying the alignment of the video information may be passed along path 89. The manner in which the auxiliary information may be extracted and decoded is discussed in more detail below.

Audio Information Decoding

Audio information decoder 86 receives blocks of encoded audio information from path 85 and applies a block-decoding process to the blocks to generate along path 87 a respective segment of decoded audio information. Each respective segment is time aligned with the video information according to a reference signal such as a master clock signal or the reference signal received from path 89 that is extracted or derived from the video/audio signal received from path 83.

Figure 10A:
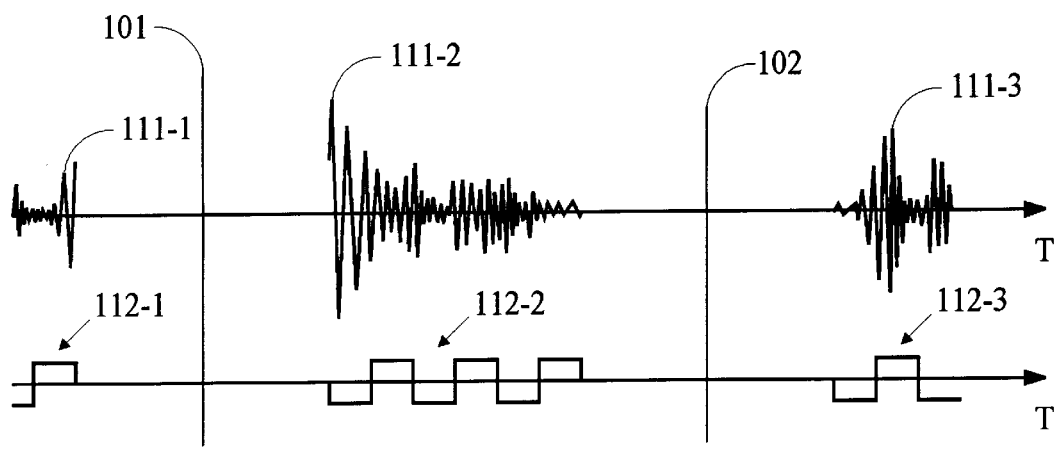
FIGS. 10A and 10B are graphical representations of hypothetical audio signals encoded and decoded by encoding and decoding signal processors.
Figure 10B:
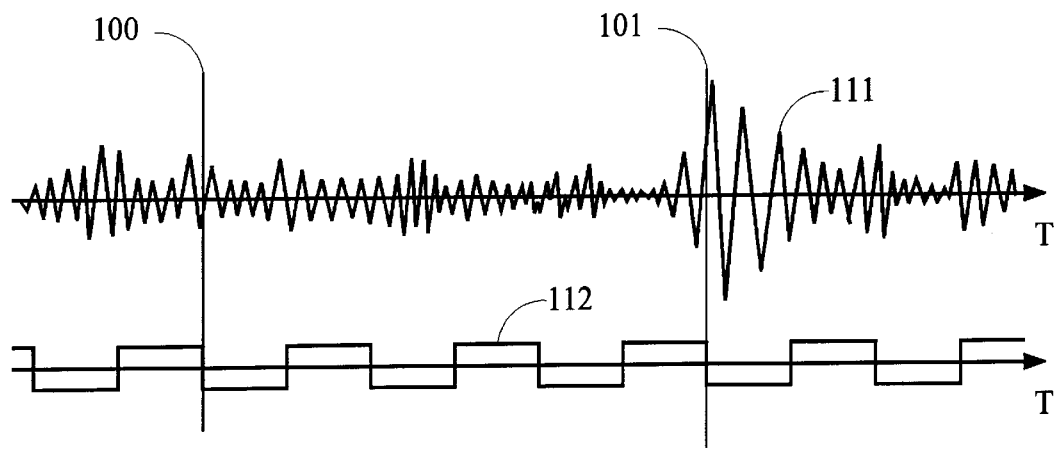

FIG. 10A reproduces the content of FIG. 5A in which a sequence of blocks in frame 112-2 conveys encoded audio information representing signal segment 111-2, which is a hypothetical time-compressed representation of the portion of signal 111 between video frame references 101 and 102. Audio information decoder 86 applies a block-decoding process to the block sequence in frame 112-2, for example, to generate signal segment 111-2; however, as shown in FIG. 10B, the portion of signal 11 corresponding to signal segment 111-2 is generated so that it is aligned with video frame reference 101. This alignment may be accomplished by delaying both the video reference and the decoded audio information by appropriate amounts. In the example shown, the video references in FIG. 10B as compared to the video references in FIG. 10A are delayed by an interval exactly equal to the duration of one video frame. No particular delay interval is critical; however, in preferred embodiments, the video references are delayed by an integer number of frames, typically one frame, so that synchronization with a master clock may be preserved.

The signal processor embodiment illustrated in FIG. 8 can be incorporated into an SDI router, for example, to process video signals containing embedded encoded audio information. An embodiment omitting signal distributor 82, which can receive and decode embedded encoded audio information, can be incorporated into a variety of equipment including VTRs, SDI disembedders, and playback/record device 41. Thus, signal distributor 82 may be located remotely with respect to aux info decoder 84, in which case path 83 may represent a communication or broadcast channel.

Figure 9:
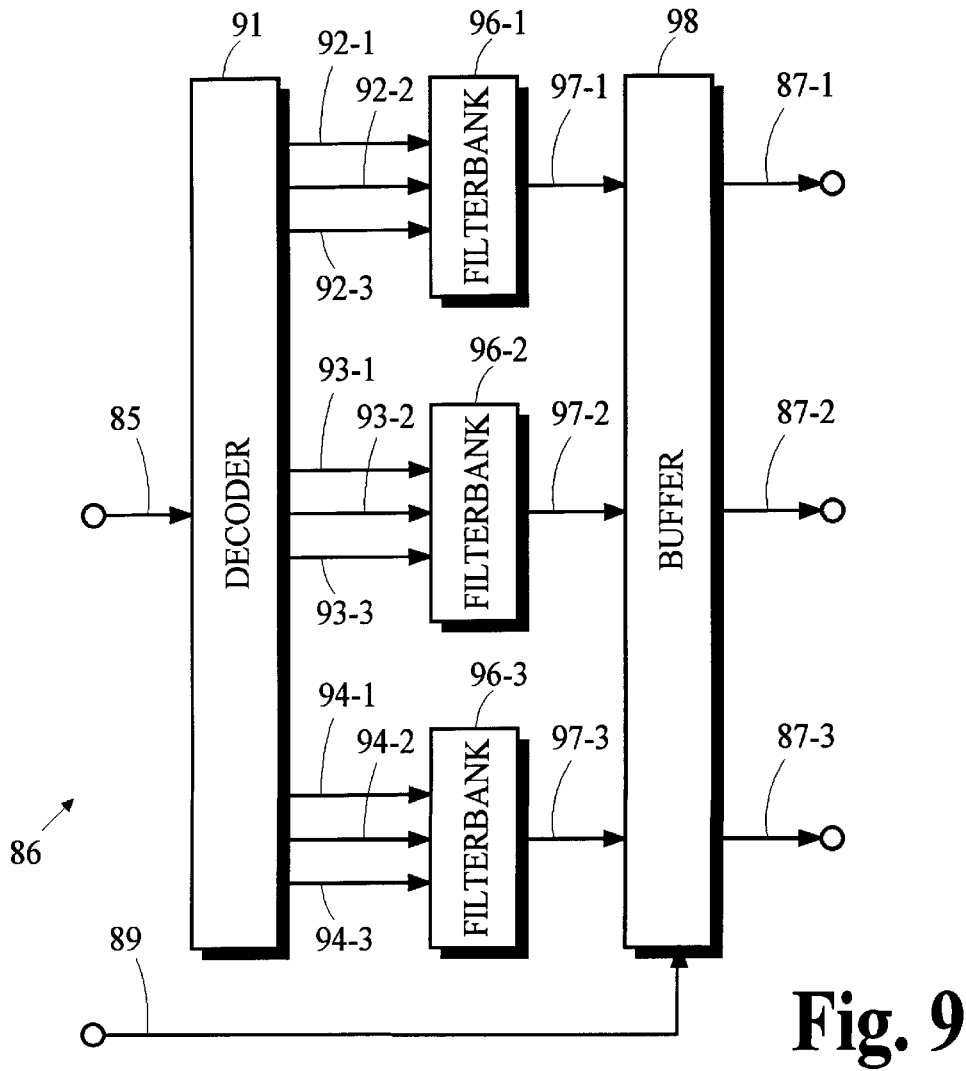
FIG. 9 is a block diagram of one embodiment of an audio information decoder.

One embodiment of decoding audio information decoder 86 is shown in FIG. 9. In the embodiment shown, decoder 91 receives blocks of encoded audio information from path 85 and recovers frequency subband signals for a plurality of channels. Subband signals for a first channel are passed along paths 92-1, 92-2 and 92-3, subband signals for a second channel are passed along paths 93-1, 93-2 and 93-3, and subband signals for a third channel are passed along paths 94-1, 94-2 and 94-3. Only three channels, each with three subband signals, are shown; however, as explained above, an embodiment may include a greater or lesser number of channels, and these channels may be represented by a considerably greater number of subband signals. In response to subband signals received from paths 92-1, 92-2 and 92-3, filterbank 96-1 generates audio information for the first channel along path 97-1. In response to subband signals received from paths 93-1, 93-2 and 93-3, filterbank 96-2 generates audio information for the second channel along path 97-2. In response to subband signals received from paths 94-1, 94-2 and 94-3, filterbank 96-3 generates audio information for the first channel along path 97-3. Buffer 98 uses a video-frame reference signal received from path 89 to align the audio information received from paths 97-1, 97-2 and 97-3, which are passed along paths 87-1, 87-2 and 87-3, respectively.

Auxiliary Information Decoding

Figure 11:
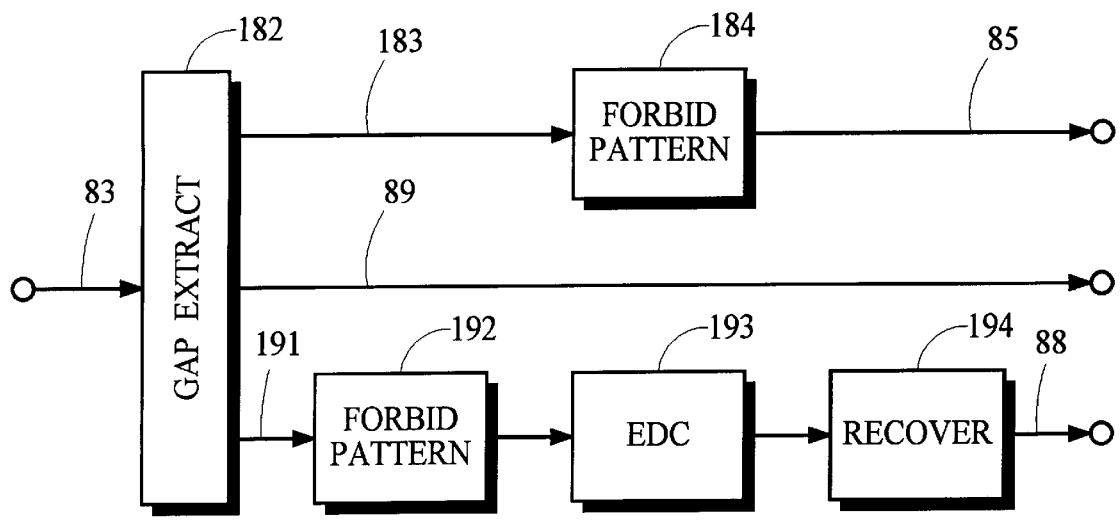
FIG. 11 is a block diagram of one embodiment of an auxiliary information decoder.

FIG. 11 illustrates an embodiment of auxiliary information decoder 84. In this embodiment, gap extract 182 receives an input signal from path 83 that conveys frames of encoded audio information separated by gaps. Gap extract 182 processes the input signal to extract the encoded audio information, which is passed along path 183, and to extract auxiliary segments from the gaps. Each auxiliary segment comprises a block of auxiliary information and an associated error-detection code that are passed along path 191. Gap extract 182 may also provide along path 89 a reference signal conveying alignment of the frames or the gaps.

Forbid pattern 184 obtains a key or other control information from the encoded audio information received from path 183 and uses this key or other control information to reverse any modifications of the encoded audio information that were made to remove occurrences of forbidden data patterns. An implementation of this processing is discussed below. If the content of the encoded audio information is constrained to avoid all forbidden data patterns, then forbid pattern 184 is not required. Blocks of encoded audio information, as modified by forbid pattern 184 if present, are passed along path 85.

Similar processing is provided by forbid pattern 192, which obtains a key or other control information from auxiliary segments received from path 191 and uses the key or other information to reverse any modifications of the auxiliary segment that were made to remove occurrences of forbidden data patterns. An implementation of forbid pattern 192 is discussed below. If the contents of the auxiliary segments are constrained to avoid all forbidden data patterns, then forbid pattern 192 is not required. Auxiliary segments, as modified by forbid pattern 192 if present, are passed to EDC 193.

Each auxiliary segment comprises a block of auxiliary information and an associated error-detection code. EDC 193 uses the error-detection code to validate the associated block of auxiliary information. For example, if an edit of audio information causes a switch between two streams of audio information to occur in a particular gap or guard band, then the block of auxiliary information in that particular gap is almost certain to have a discontinuity between portions of the block that represent auxiliary information from the two streams. The discontinuity in the block of auxiliary information most likely invalidates the contents of that block. By using the error-detection code obtained from an auxiliary segment, EDC 193 can determine if the contents of the block of auxiliary information in that segment are the same as when the error-detection code was generated. If the block contents are the same, the block is deemed to be invalid and some form of error recovery is carried out by recover 194. The results of the error recovery process are passed along path 88. If the block contents are the same, that block of auxiliary information may be passed along path 88 without carrying out an error recovery process.

Recover 194 may carry out essentially any form of error recovery process for an invalidated block. For example, recovery 194 may use a buffer to store the most recent valid block of auxiliary information. Whenever EDC 193 indicates a block of auxiliary information is invalid, recover 194 can provide along path 88 the most recent valid block as a substitute for the invalid block. As another example, recover 194 may generate along path 88 a substitute block by applying some form of prediction such as linear prediction to one or more of the most recent valid blocks of auxiliary information. As yet another example, recover 194 causes the contents of invalid blocks to be ignored. If the available space or bandwidth provided by the gaps is sufficient, duplicate blocks can be conveyed in successive gaps and recover 194 may obtain needed information from one of the blocks that is deemed to be valid.

If desired, the recovery process can be adapted or can be selected from two or more alternative processes according to control information provided in the auxiliary segment. For example, this control information may be conveyed by using more than one data pattern for the aux sync words. An aux sync word with a first data pattern would indicate a first recovery process should be carried out if the block associated with that aux sync word is invalid. An aux sync word with a second data pattern would indicate a second error recovery process should be carried out. Additional data patterns may be used to indicate additional processes should be used.

Overlapping Blocks and Window Functions

The train of pulses used in the figures to represent blocks of information suggest that adjacent blocks abut but do not overlap one another. Although no particular arrangement of blocks is critical, preferred embodiments process blocks that overlap one another. Generally, overlapped blocks of audio information are weighted or modulated by a window function so that the sum of overlapped samples in adjacent blocks is substantially equal to a constant.

Figure 12:
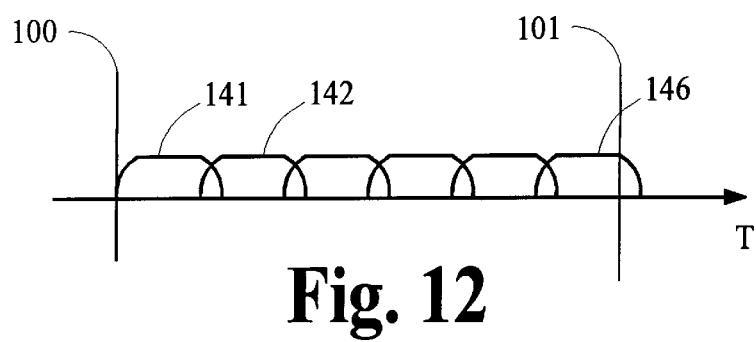
FIG. 12 is a graphical schematic representation of overlapping audio information blocks weighted by window functions.

FIG. 12 illustrates a sequence of blocks. Beginning block 141 in the sequence overlaps adjacent block 142. All blocks in the sequence are represented by an envelope that has the shape of a window function used to weight corresponding audio information in the time domain. Ending block 146 in the sequence overlaps the preceding block and a subsequent block not shown in the figure. The amount of overlap and the choice of window function can have significant effects on coding performance but no particular window function or amount of overlap is critical. In preferred embodiments, the amount of overlap is equal to one-half the block length and the window function is derived from the Kaiser-Bessel function.

As explained above, audio information decoder 86 generates audio information that is aligned with video frame references. In embodiments that generate frames comprising a sequence of blocks of encoded audio information, the alignment may be such that a video frame reference is coincident with essentially any point in any block of the sequence. In the example shown in FIG. 12, the start of beginning block 141 is coincident with video frame reference 100.

In some applications, the exact point of coincidence may vary from video frame to video frame. For example, in applications that combine digital audio information with NTSC video information, successive video frames may have varying numbers of audio samples because the audio sampling rate is not an integer multiple of the video frame rate.

Various considerations for block length, window function, and video/audio alignment are discussed in U.S. patent application Ser. No. 08/953,106, referred to above.

Avoiding Forbidden Data Patterns

It is desirable in many applications that create, store or transmit information, to designate certain bit patterns as "forbidden" such that these patterns do not occur in digital words conveying the information. One example is the data pattern used for "sync" words to mark the boundary of a frame of information in a data stream.

Another example arises in data words that convey audio information in a linear pulse code modulation (PCM) form. In the case of 16-bit PCM that is expressed in two's complement representation, audio amplitude values can vary within a range from 32767 (expressed in hexadecimal notation as 0x7FFF) through −32768 (0x8000). In this representation, a slight amount of asymmetry is introduced by virtue of the most-negative value being one unit of magnitude larger than the most-positive value. Some equipment is designed to prevent this asymmetry by avoiding the most-negative value of 0x8000. If this value is not used for conveying PCM amplitude, it can be and sometimes is used for some other purpose such as conveying control or signaling information. If a PCM sample having this value does occur in the audio information, it could be incorrectly identified as control or signaling information; therefore, this particular data pattern is deemed to be forbidden and should be avoided in the audio information.

One technique described below may be used to avoid forbidden data patterns in segments or blocks of information and subsequently to recover the original information. This discussion and the related figures refer to processing of auxiliary segments as provided by forbid pattern 173 and forbid pattern 192 discussed above; however, this discussion and the figures are also pertinent to processing audio information as provided by forbid pattern 162 and forbid pattern 184. Additional information and techniques for avoiding forbidden data patterns may be obtained from U.S. patent application Ser. No. 09/175,090 entitled "Avoiding Forbidden Data Patterns in Coded Audio Data" filed Oct. 19, 1998.

Encoding

Figure 13:
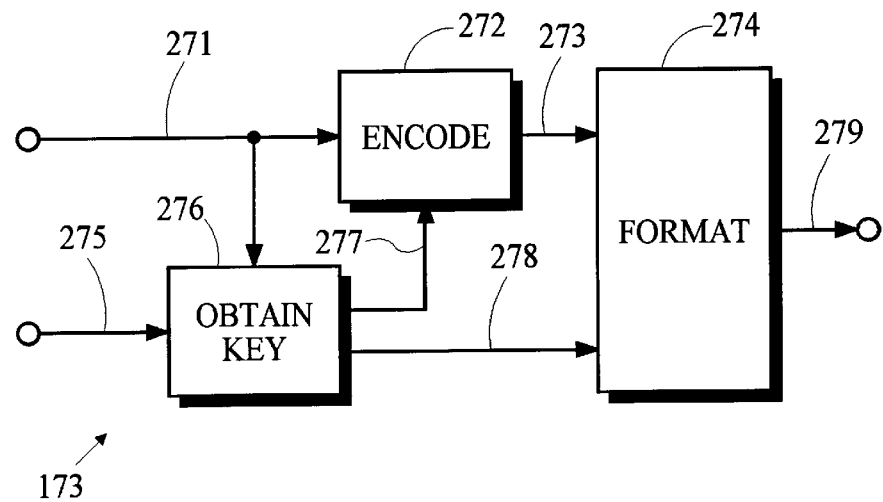
FIG. 13 is a block diagram of an encoder for avoiding forbidden data patterns.

FIG. 13 is a block diagram of forbid pattern 173 for avoiding forbidden data patterns by using a reversible coding process to generate an encoded representation of information that cannot contain any forbidden data patterns. This may be accomplished by encoding segments or blocks of information according to a respective encoding key that is selected such that the results of the coding process cannot contain a forbidden data pattern.

Referring to FIG. 13, forbid pattern 173 receives from path 271 auxiliary segments that may contain one or more forbidden data patterns. Obtain key 276 analyzes the contents of a respective segment to identify a suitable encoding key for that segment and passes the encoding key along path 277 to encode 272. Encode 272 generates along path 273 an encoded representation of the segment according to the encoding key received from path 277. Obtain key 276 passes along path 278 some key information, such as a decoding key or some other information from which a suitable decoding key can be derived. Format 274 assembles the key information received from path 278 with the encoded representation received from path 273 and passes the result along path 279 for subsequent processing by aux sync 174 and/or gap insert 178 as shown in FIG. 6.

The choice of keys is dependent on the characteristics of the process carried out by encode 272. It is anticipated that encode 272 applies a symmetrical coding process, which means the encoding key and the decoding key are identical.

Symmetrical coding processes are generally preferred because they can usually be implemented more efficiently. Alternatively, obtain key 276 may identify distinct encode and decode keys. In this case, encode 272 applies an asymmetric coding process according to the encode key received from path 277 and some representation of the decoding key, or some information from which the decoding key can be derived, is passed along path 278 to format 274 for assembly with the encoded representation.

Coding Key

In one embodiment, a symmetric coding process is carried out by performing a bit-wise exclusive-OR between a key K and each digital word W(i) in a segment of the information stream. This coding process can be expressed as $$X(i)=K \oplus W(i). \quad (1)$$

The exclusive-OR operation is symmetric coding process because it is a self-reversing process; that is, for any arbitrary key K, the original word W(i) can be obtained from an encoded word X(i) by applying the exclusive-OR operation with the same key a second time, which can be expressed as $$W(i)=K \oplus X(i)=K \oplus (K \oplus W(i)). \quad (2)$$

A suitable key K that avoids a forbidden data pattern F in particular segment may be selected for this coding process by identifying a data pattern U that does not occur in any digital word in the segment, and then performing a bit-wise exclusive-OR between the "unused" data pattern U and the forbidden data pattern F. The key K selected in this manner ensures the forbidden data pattern will not occur in the encoded segment. As explained below, if the unused data pattern is constrained to be non-zero, this choice of key also ensures the key itself does not equal the forbidden data pattern.

The operation used to obtain the key can be expressed as $$K=U \oplus F. \quad (3)$$

By substituting this expression for key K into equation 1, the coding process can be rewritten as $$X(i)=K \oplus W(i)=U \oplus F \oplus W(i). \quad (4)$$

If the unused data pattern U equals zero, the key K will equal the forbidden data pattern F because an exclusive-OR between any arbitrary value V and a zero value returns the arbitrary value V. In preferred embodiments, the unused data pattern U is constrained to be non-zero, which prevents the key K itself from being equal to the forbidden data pattern F. If the key were allowed to equal the forbidden data pattern, a modified representation of the key rather than the key itself would have to be provided to format 274 for assembly with the encoded segment to prevent the forbidden data pattern from appearing in the encoded information.

Unused Data Pattern

Figure 14:
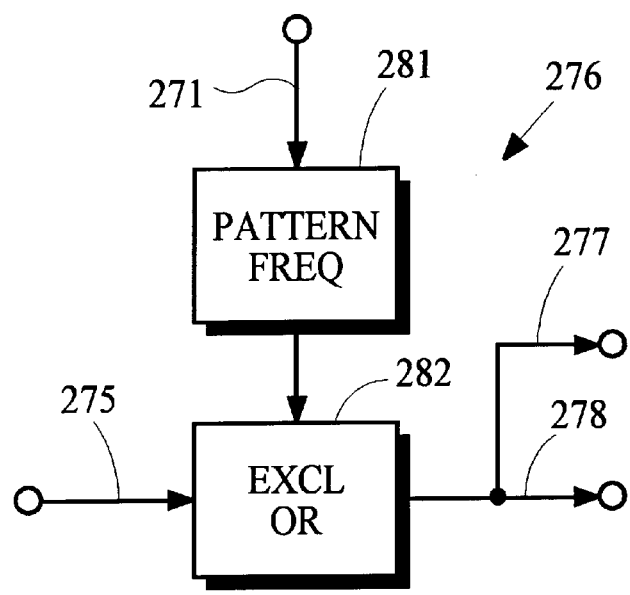
FIG. 14 is a block diagram of a component for obtaining a key that is suitable for use in the encoder of FIG. 13.

One embodiment of obtain key 276 that can identify an unused data pattern is shown in FIG. 14. Pattern frequency 281 forms an array that indicates whether particular data patterns occur in the segment, selects a non-zero data pattern U that does not occur in the segment, and passes the unused data pattern to exclusive-OR 282. Exclusive-OR 282 receives the unused data pattern U from pattern frequency 281, receives the forbidden data pattern F from path 275, and obtains the encoding key K according to equation 3. In this embodiment, the bit-wise exclusive-OR process of encode 272 is a symmetric coding process; therefore, the same key K is passed along paths 277 and 278.

One method for finding an unused data pattern begins by constructing an array of elements representing each possible data pattern and initializing each element with the value zero. The contents of each digital word in the segment is examined and, based on these contents, the corresponding element in the array is set to one. After all digital words in the segment have been examined, the elements in the array are examined to find one that is still set to zero. Each zero-valued element in the array corresponds to data patterns that do not occur in the segment.

Actual frequency counts for each data pattern may be calculated but this is not necessary. It is sufficient to merely update each element to show a corresponding data pattern occurs in the original segment.

This technique can be made very efficient for small segment lengths by constructing an array with a number of elements that decreases as the segment length decreases. The number of elements may be set equal to the smallest power of two, say $2^B$, that is greater than or equal to the segment length. In this case, only the B most-significant bits of each digital word needs to be examined. After all digital words in the original segment have been examined, a zero-valued array element may be selected and used to determine the B most-significant bits of an unused word. The remaining least-significant bits for the unused data pattern can be set arbitrarily. If desired, these least-significant bits may be set to ones to ensure the unused data pattern is not equal to zero.

This process is shown in the following program fragment. This program fragment is expressed in a syntax that includes some syntactical features of the C and BASIC program languages; however, the program fragment can be understood by those who are not familiar with these languages. This program fragment is not intended to be source code segments suitable for compilation but is shown merely to convey a few aspects of a possible implementation.

```
(1)   size = ceiling(log2(segment_length));
(2)   initialize array[power(2, size)];
(3)   for j=1 to segment_length {
(4)       read word;
(5)       index = msbits(word, size);
(6)       array[index] = 1;
(7)   }
(8)   index = power(2, size)-1;
(9)   while array[index] ≠ 0
(10)      index = index - 1;
(11)  unused_word = left_shift(index, len-size) | lsbits(ones, len-size);
```

The statement in line (1) initializes the integer "size" to the smallest integer power of two that is larger than the segment length. In this statement, the function "log2" returns the base-2 logarithm of the segment length and the function "ceiling" returns the smallest integer that is greater than or equal to this logarithm. The statement in line (2) allocates "array" with a number of elements equal to two raised to the power "size" and initializes each element to a value of zero. The statement in line (3) causes the statements in lines (4) through (6) to reiterate until all digital words in a segment have been examined. The statement in line (4) obtains the next digital word from the segment. The statement in line (5) obtains the "size" most-significant bits of this digital word and converts these bits into a value that is assigned to the variable "index". In this example, it is assumed that each digital word has a number of bits equal to "len". The statement in line (6) ensures the element of "array" that corresponds to this "index" value is set to one. After all digital words in the segment have been examined, the statements in lines (8) through (10) find an element of "array" that has a value of zero and sets "index" equal to the number of this element. The statement in line (11) constructs a non-zero unused data pattern by shifting the value of "index" into the most-significant bits of a digital word and performing a bit-wise OR with the "(len-size)" number of least-significant bits of this value and an appropriate number of bits having the value of one.

As an example, if an original segment comprises 16-bit digital words and the segment length is 2002, the smallest power of two that is greater than or equal to the segment length is $2^{11}$ or 2048. An array of 2048 elements is constructed and updated as the eleven most-significant bits of each digital word in the segment is examined. For example, the two data patterns 0x0000 and 0x001F, expressed in hexadecimal notation, would both cause the first element in the array to be updated because the eleven most-significant bits of both data patterns are the same. In this example, the eleven most-significant bits of both data patterns are all zero. Continuing the example, if the second element of the array indicates no corresponding data patterns occur in the original segment, then it is known that no digital word in the segment has a data pattern with the ten most-significant bits set to zero and the eleventh most-significant bit set to one. An unused data pattern may be selected from any value in the range from 0x0020 to 0x003F.

If desired, the array can also be examined to determine if any digital word in the segment has the forbidden data pattern. If not, the processing required to perform the encoding operation, such as that shown in equation 1, could be avoided. This condition can be conveyed in the encoded information by setting the coding key to zero, assuming of course that zero is not a forbidden data pattern. If the exclusive-OR coding process described above is used, a zero-valued key is the normal consequence of choosing the forbidden data pattern as the unused data pattern.

Multiple Forbidden Data Patterns

This technique can be extended to avoid multiple forbidden data patterns. If the segment length is significantly smaller than the number of all possible values for the digital words, it may be possible to choose a single key that ensures avoidance of two or more forbidden data patterns. For example, if the segment length is less than the square root of the number of all possible values, it is always possible to find a single key word that avoids two forbidden data patterns. This key can be obtained by selecting the most-significant half of the key's bits to avoid the first forbidden data pattern and selecting the least-significant half of the key's bits to avoid the second forbidden data pattern. If the two forbidden data patterns have any bits in common, the segment length can be longer and still guarantee avoiding both forbidden data patterns.

Recovery of the Original Information

Figure 15:
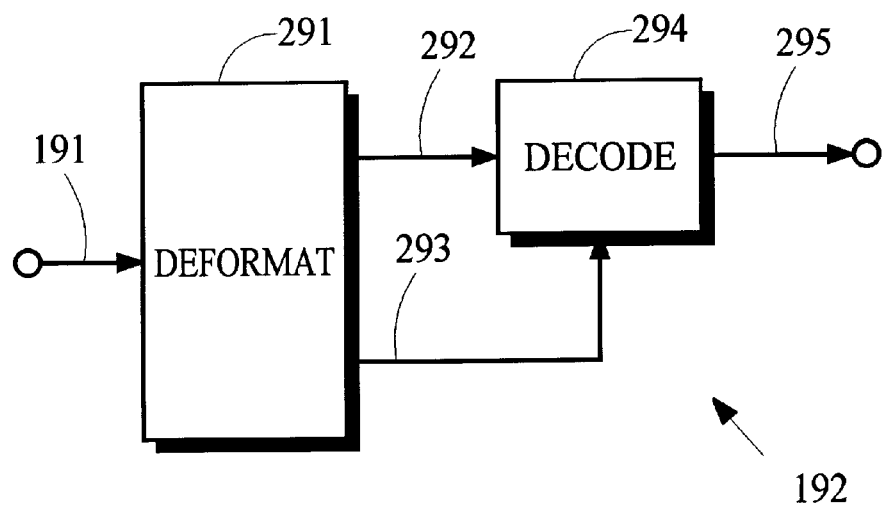
FIG. 15 is a block diagram of a decoder for recovering forbidden data patterns.

FIG. 15 is a block diagram of forbid pattern 192 that recovers the original information from the encoded information generated by forbid pattern 172. Deformat 291 receives encoded segments from path 191, extracts decoding keys from the encoded segments, and passes the encoded segments along path 292 and the decoding keys along path 293. In this context, the term "extract" as used here and elsewhere in this description refers generally to deformatting and/or derivation processes that obtain information from what is conveyed by received information. Decode 294 applies a decoding process to the encoded segments according to the respective decoding keys. The decoded segments that result from the decoding process are passed along path 295 for subsequent processing by EDW 193 as shown in FIG. 11.

If the decoding process applied by decode 294 is complementary to the encoding process used to generate the encoded information, the decoded segments will contain the same information that was conveyed in corresponding segments of the original information. In one embodiment, decode 294 carries out the decoding process by performing exclusive-OR operations as shown above in equation 2.

If desired, a zero-valued key can indicate no decoding is required. As explained above, this situation is the normal result when using the exclusive-OR coding process.

Preferably, the decoding key and any needed indication of segment boundary are assembled at the start of the encoded information so that the decoding operation may be performed as each encoded segment is obtained from the encoded information.

Implementation

The functions required to practice various aspects of the present invention can be performed by components that are implemented in a wide variety of ways including discrete logic components, one or more ASICs and/or program-controlled processors. The manner in which these components are implemented is not important to the present invention. For example, the operations required to practice the present invention can be implemented in a system that comprises one or more terminals for receiving and sending signals representing digital information, random access memory for storing received information, a medium for recording one or more programs of instructions, and a processor that executes the programs of instructions to carry out the present invention. The programs of instructions may be recorded or conveyed by a variety machine readable medium including various types of read-only memory, magnetic tape, magnetic disk, optical disc, and baseband or modulated communication paths throughout the spectrum from supersonic to ultraviolet frequencies.

What is claimed is:

1. A method for encoding audio information and auxiliary information comprising steps that perform the acts of:

receiving an audio signal conveying audio information, receiving a reference signal, receiving an auxiliary signal conveying auxiliary information, constructing auxiliary segments each comprising a block of auxiliary information and an error detection code, and generating an output signal conveying the audio information arranged in frames separated by gaps such that each gap is aligned with the reference signal and conveys a respective auxiliary segment, wherein the audio information in the frames of audio information and the auxiliary information in the segments of auxiliary information are constrained to avoid data patterns in a set of one or more forbidden data patterns.

2. A method according to claim 1 wherein the audio information is formatted according to standard ANSI S4.40 and is arranged in the frames according to standard SMPTE 272M.

3. A method according to claim 1 that further comprises processing the frames of audio information to avoid data patterns in the set of one or more forbidden data patterns.

4. A method according to claim 1 that further comprises processing the auxiliary information to avoid data patterns in the set of one or more forbidden data patterns.

5. A method according to claim 1 that constructs auxiliary segments with a variable length block of auxiliary information and an indication of that length, wherein the indication of that length is formed such that it avoids data patterns in the set of one or more forbidden data patterns.

6. A method according to claim 1 that constructs the auxiliary segments with an auxiliary synchronization word having a data pattern in the set of one or more forbidden data patterns.

7. A method according to claim 1 that constructs the auxiliary segments with respective auxiliary synchronization words selected from the set of forbidden data patterns, wherein the set of forbidden data patterns includes a plurality of forbidden data patterns.

8. A method according to claim 1 wherein the frames of audio information comprise an audio synchronization word having a data pattern in the set of one or more forbidden data patterns.

9. A method for processing audio information and auxiliary information comprising steps that perform the acts of:
  receiving an input signal conveying audio information arranged in frames separated by gaps and conveying auxiliary segments arranged in the gaps,
  processing the input signal to locate the auxiliary segments,
  for each respective auxiliary segment, extracting a block of auxiliary information and an error detection code, and evaluating the error detection code to validate contents of the block of auxiliary information.

10. A method according to claim 9 wherein the audio information is formatted according to standard ANSI S4.40 and is arranged in the frames according to standard SMPTE 272M.

11. A method according to claim 9 that further comprises extracting control information to control processing of the frames of audio information to restore data patterns in a set of one or more forbidden data patterns.

12. A method according to claim 9 that further comprises extracting control information to control processing of the auxiliary information to restore data patterns in a set of one or more forbidden data patterns.

13. A method according to claim 9 that further comprises, for each respective auxiliary segment, extracting an indication of length and using the indication to extract blocks of auxiliary information having a length that varies according to the indication of length.

14. A method according to claim 9 wherein each auxiliary segment comprises an auxiliary synchronization word having an auxiliary sync pattern and the input signal processing uses the auxiliary synchronization word to locate respective auxiliary segments, and wherein the method processes the frames of audio information and the remainder of the auxiliary segments to restore data patterns equal to the auxiliary sync pattern.

15. A method according to claim 9 that further comprises generating an output signal conveying information obtained from an error recovery process in response to blocks of auxiliary information with contents that are invalid.

16. A method according to claim 15 wherein each auxiliary segment comprises an auxiliary synchronization word having one of a plurality of sync patterns, and wherein input signal processing uses the auxiliary synchronization word to locate respective auxiliary segments and the error recovery process is adapted according to the pattern of the auxiliary synchronization word, and wherein the method processes the frames of audio information and the remainder of the auxiliary segments to restore data patterns equal to the plurality of sync patterns.

17. A method according to claim 9 wherein the frames of audio information comprise an audio synchronization word having an audio sync pattern, and wherein the method processes the remainder of the frames of audio information and the auxiliary segments to restore data patterns equal to the audio sync pattern.

18. A medium readable by a machine embodying a program of instructions for execution by said machine to perform a method for encoding audio information and auxiliary information, wherein the method comprises:
  receiving an audio signal conveying audio information,
  receiving a reference signal,
  receiving an auxiliary signal conveying auxiliary information,
  constructing auxiliary segments each comprising a block of auxiliary information and an error detection code, and
  generating an output signal conveying the audio information arranged in frames separated by gaps such that each gap is aligned with the reference signal and conveys a respective auxiliary segment, wherein the audio information in the frames of audio information and the auxiliary information in the segments of auxiliary information are constrained to avoid data patterns in a set of one or more forbidden data patterns.

19. A medium according to claim 18 wherein the audio information is formatted according to standard ANSI S4.40 and is arranged in the frames according to standard SMPTE 272M.

20. A medium according to claim 18 wherein the method further comprises processing the frames of audio information to avoid data patterns in the set of one or more forbidden data patterns.

21. A medium according to claim 18 wherein the method further comprises processing the auxiliary information to avoid data patterns in the set of one or more forbidden data patterns.

22. A medium according to claim 18 wherein the method constructs auxiliary segments with a variable length block of auxiliary information and an indication of that length, wherein the indication of that length is formed such that it avoids data patterns in the set of one or more forbidden data patterns.

23. A medium according to claim 18 wherein the method constructs the auxiliary segments with an auxiliary synchronization word having a data pattern in the set of one or more forbidden data patterns.

24. A medium according to claim 18 wherein the method constructs the auxiliary segments with respective auxiliary synchronization words selected from the set of forbidden data patterns, wherein the set of forbidden data patterns includes a plurality of forbidden data patterns.

25. A medium according to claim 18 wherein the frames of audio information comprise an audio synchronization word having a data pattern in the set of one or more forbidden data patterns.

26. A medium readable by a machine embodying a program of instructions for execution by said machine to perform a method for processing audio information and auxiliary information, wherein the method comprises:

receiving an input signal conveying audio information arranged in frames separated by gaps and conveying auxiliary segments arranged in the gaps, processing the input signal to locate the auxiliary segments, for each respective auxiliary segment, extracting a block of auxiliary information and an error detection code, and evaluating the error detection code to validate contents of the block of auxiliary information, and generating an output signal conveying information obtained from an error recovery process in response to blocks of auxiliary information with contents that are invalid.

27. A medium according to claim 26 wherein the audio information is formatted according to standard ANSI S4.40 and is arranged in the frames according to standard SMPTE 272M.

28. A medium according to claim 26 wherein the method further comprises extracting control information to control processing of the frames of audio information to restore data patterns in a set of one or more forbidden data patterns.

29. A medium according to claim 26 wherein the method further comprises extracting control information to control processing of the auxiliary information to restore data patterns in a set of one or more forbidden data patterns.

30. A medium according to claim 26 wherein the method further comprises, for each respective auxiliary segment, extracting an indication of length and using the indication to extract blocks of auxiliary information having a length that varies according to the indication of length.

31. A medium according to claim 26 wherein each auxiliary segment comprises an auxiliary synchronization word having an auxiliary sync pattern and the input signal processing uses the auxiliary synchronization word to locate respective auxiliary segments, and wherein the method processes the frames of audio information and the remainder of the auxiliary segments to restore data patterns equal to the auxiliary sync pattern.

32. A medium according to claim 26 wherein the method further comprises generating an output signal conveying information obtained from an error recovery process in response to blocks of auxiliary information with contents that are invalid.

33. A medium according to claim 32 wherein each auxiliary segment comprises an auxiliary synchronization word having one of a plurality of sync patterns, and wherein input signal processing uses the auxiliary synchronization word to locate respective auxiliary segments and the error recovery process is adapted according to the pattern of the auxiliary synchronization word, and wherein the method processes the frames of audio information and the remainder of the auxiliary segments to restore data patterns equal to the plurality of sync patterns.

34. A medium according to claim 26 wherein the frames of audio information comprise an audio synchronization word having an audio sync pattern, and wherein the method processes the remainder of the frames of audio information and the auxiliary segments to restore data patterns equal to the audio sync pattern.

35. An apparatus for encoding audio information and auxiliary information comprising:

(a) one or more terminals that receive an audio signal conveying audio information, a reference signal and an auxiliary signal conveying auxiliary information;

(b) a program-controlled processor or other processing circuitry that:

(i) constructs auxiliary segments each comprising a block of auxiliary information and an error detection code, and (ii) generates an output signal conveying the audio information arranged in frames separated by gaps such that each gap is aligned with the reference signal and conveys a respective auxiliary segment, wherein the audio information in the frames of audio information and the auxiliary information in the segments of auxiliary information are constrained to avoid data patterns in a set of one or more forbidden data patterns; and (c) a terminal for sending the output signal.

36. An apparatus according to claim 35 wherein the program-controlled processor or other processing circuitry processes the frames of audio information to avoid data patterns in the set of one or more forbidden data patterns.

37. An apparatus according to claim 35 wherein the program-controlled processor or other processing circuitry processes the auxiliary information to avoid data patterns in the set of one or more forbidden data patterns.

38. An apparatus according to claim 35 wherein the program-controlled processor or other processing circuitry constructs the auxiliary segments with respective auxiliary synchronization words selected from the set of forbidden data patterns, wherein the set of forbidden data patterns includes a plurality of forbidden data patterns.

39. An apparatus for processing audio information and auxiliary information comprising:

(a) a terminal that receives an input signal conveying audio information arranged in frames separated by gaps and conveying auxiliary segments arranged in the gaps;

(b) a program-controlled processor or other processing circuitry that:

(i) processes the input signal to locate the auxiliary segments, (ii) for each respective auxiliary segment, extracts a block of auxiliary information and an error detection code, and evaluates the error detection code to validate contents of the block of auxiliary information; and (c) a terminal for sending auxiliary information.

40. An apparatus according to claim 39 wherein the program-controlled processor or other processing circuitry extracts control information to control processing of the frames of audio information to restore data patterns in a set of one or more forbidden data patterns.

41. An apparatus according to claim 39 wherein the program-controlled processor or other processing circuitry extracts control information to control processing of the auxiliary information to restore data patterns in a set of one or more forbidden data patterns.

42. An apparatus according to claim 39 wherein the program-controlled processor or other processing circuitry generates an output signal conveying information obtained from an error recovery process in response to blocks of auxiliary information with contents that are invalid.

43. An apparatus according to claim 42 wherein each auxiliary segment comprises control information and the program-controlled processor or other processing circuitry uses the control information to adapt the error recovery process.

* * * * *